US008704655B2

(12) United States Patent
Scannell

(10) Patent No.: US 8,704,655 B2
(45) Date of Patent: Apr. 22, 2014

(54) METHOD AND SYSTEM FOR PROVIDING PRESENCE-BASED COMMUNICATION OVER A CELLULAR NETWORK FOR A DWELLING

(75) Inventor: Louise P. Scannell, Valrico, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 303 days.

(21) Appl. No.: 13/216,703

(22) Filed: Aug. 24, 2011

(65) Prior Publication Data
US 2013/0049954 A1 Feb. 28, 2013

(51) Int. Cl.
G08B 1/08 (2006.01)
H04M 1/725 (2006.01)

(52) U.S. Cl.
USPC .............. 340/539.11; 340/539.1; 340/539.14; 340/539.17; 340/531; 455/404.1; 455/412.2

(58) Field of Classification Search
USPC .................................. 340/539.11; 455/412.2
See application file for complete search history.

(56) References Cited

U.S. PATENT DOCUMENTS 7,113,090 B1 * 9/2006 Saylor et al. ............. 340/539.18

* cited by examiner

Primary Examiner — Donnie Crosland

(57) ABSTRACT

An approach for providing presence-based communication over a cellular network for a dwelling is described. A notification message is received over a wireless network to a mobile device associated with a user, wherein the notification message indicates generation of a presence indication signal by a device within a premise of the user. A registration status of the mobile device with the notification service is determined. The notification message is forwarded to the mobile device based on the registration status.

20 Claims, 10 Drawing Sheets

US 8,704,655 B2

METHOD AND SYSTEM FOR PROVIDING PRESENCE-BASED COMMUNICATION OVER A CELLULAR NETWORK FOR A DWELLING

BACKGROUND INFORMATION

Service providers are continually challenged to deliver value and convenience to consumers by providing compelling network services and advancing the underlying technologies. One area of interest has been the development of services and technologies relating to physical security, which may describe measures designed to prevent unauthorized access to a building, facility, resource, etc. These measures may include any combination of deterrence, delay, detection, and response to unauthorized access. As an example, a common method of physical security for a home is to install an intruder alarm system and post signs warning others that the home is protected with such a system. Although having an intruder alarm system provides some deterrence, it is however only among a number of factors considered by an intruder in deciding whether to break into a home. Burglars, for instance, are more likely to break into a home when there are indications that there is no one currently inside. For example, such an indication is created when the doorbell is rung and no one answers.

Therefore, there is a need for an effective approach for providing security for a dwelling or premise.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for providing presence-based communication over a cellular network for a dwelling are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
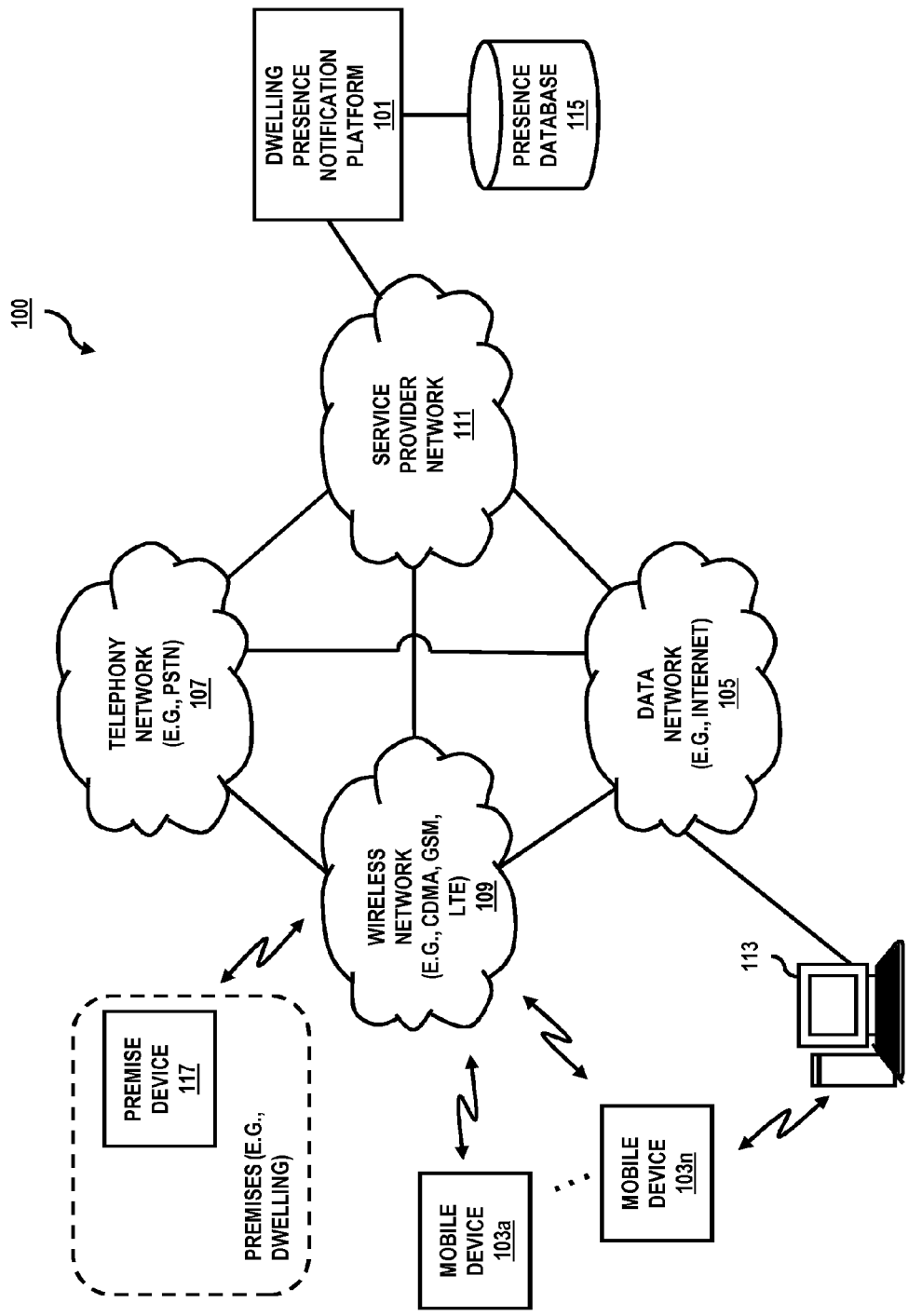
FIG. 1 is a diagram of a system capable of providing presence-based communication over a cellular network for a dwelling, according to an exemplary embodiment.

FIG. 1 is a diagram of a system capable of providing presence-based communication over a cellular network for a dwelling, according to an exemplary embodiment. For the purpose of illustration, the system 100 employs a dwelling presence notification platform 101 that is configured to provide presence-based communication over a cellular network to one or more user devices (e.g., mobile devices 103) over one or more networks (e.g., data network 105, telephony network 107, wireless network 109, etc.). According to one embodiment, services including notification of a person's presence at a dwelling may be part of managed services supplied by a service provider (e.g., a wireless communication company) as a hosted or subscription-based service made available to users of the mobile devices 103 through a service provider network 111. As shown, the dwelling presence notification platform 101 may be a part of or connected to the service provider network 111. Alternatively, the dwelling presence notification platform 101 may be included within or connected to a computer device 113, the mobile devices 103, etc. While specific reference will be made thereto, it is contemplated that the system 100 may embody many forms and include multiple and/or alternative components and facilities. Dwelling presence notification platform 101, in some embodiments, can provide effective security through quick and ubiquitous notification of a person outside a dwelling (or premise) as well as provide appearance of presence within the dwelling.

In certain embodiments, the dwelling presence notification platform 101 may include or have access to a presence database 115. For example, the dwelling presence notification platform 101 may access the presence database 115 to acquire user preference information, context information, etc., or to store presence of persons detected. User preference information, the user's context information, and presence information may, for instance, be used to determine whether or not to send notification messages to the user. In one scenario, a user may be at home when the presence of the person outside the home is detected through the person's use of a doorbell. Based on the user preference information and the user's current location, it may be determined that, in such a situation, generation or presentation of a notification message, for instance, at a premise device 117 may not be necessary since the user may simply hear the doorbell chime and answer the door.

As mentioned, measures of a security system may include any combination of deterrence, delay, detection, and response to unauthorized access. As a cost-effective addition, some mechanism of deterrence is typically incorporated into security systems. A home with an intruder alarm system will, for instance, also have signs posted outside the home to warn others that the home is protected by such a system. These warnings, by themselves, however may not be sufficient to deter unauthorized entry into the home. As mentioned, burglars are more likely to break into a home when there are indications that there is no one currently inside (e.g., to avoid being seen, to reduce the risk of greater felony charges, etc.). In many instances, burglars will ring the doorbell to see if anyone answers the door. If there is no response, burglars are much more likely to attempt a break-in since they are able to confirm that no one is currently inside.

To address this issue, the system 100 of FIG. 1 introduces the capability to create the appearance of presence within a dwelling or other structure. By way of example, the dwelling presence notification platform 101 may detect a signal triggered by presence of a person at a premise of a user (e.g., the user's property, the area around a building, etc.). The detection may, for instance, be triggered by the use of a doorbell, a sensor, or a camera. Upon detection, a presence indication signal may be generated and presented at the premise device 117. The premise device 117 may, for instance, include an intercom device as well as other equivalent communication devices within the premise. A notification message, indicating the generation of the presence indication signal, may then be transmitted over a wireless network 109 (e.g., a cellular network) to a mobile device (e.g., mobile device 103a) associated with a user (e.g., subscriber). The notification message may, for instance, be transmitted to alert the user as to the person's presence.

By way of another example, the notification message to the mobile device 103a may be received by a service provider (e.g., service provider 111 via the dwelling presence notification platform 101). Subsequently, the service provider may determine whether the mobile device 103a is registered with a notification service associated with the service provider and forward the notification message to the mobile device 103a if the mobile device 103a is registered with the notification service. The following scenarios illustrate typical situations that dwelling presence notification platform 101 can be more effective in securing a dwelling.

In one scenario, a burglar may conduct surveillance of homes to determine the pattern of activity of the homeowners. That is, during surveillance of the homes, the burglar may notice several indications that all of the occupants of a particular home are out. By way of example, the burglar may notice that no lights are turned on in the house, that no vehicles are on the driveway, or that the morning newspaper has not been picked up. Based on such observations, the burglar may ring the doorbell to confirm that there is no one currently at home. In this case, however, the ringing of the doorbell may cause a message to be sent to the homeowner, via the homeowner's mobile phone, to alert the homeowner that there is someone at the door. An interface may thereafter be provided to the homeowner to allow communication with the burglar. Notwithstanding whether there is actually anyone in the house, the homeowner may still want to create the appearance that he/she is currently inside to deter any unauthorized intrusions. Thus, the homeowner may greet the burglar (or whoever may be outside) and then ask for identification or matter information (e.g., "Who are you? Can I help you?"). The greeting along with the questions from the homeowner may lead the burglar to believe that the homeowner is inside, thereby deterring the burglary of the home.

In another scenario, the person at the door may not be a burglar, but is there to deliver a package. When the package deliverer rings the doorbell, an alert may be transmitted to the homeowner's mobile phone, thereby initiating an interface for the homeowner to communicate with the package deliverer. Because the homeowner may be unaware of who is actually at the door, the homeowner may greet the package deliverer and ask for identification or matter information (e.g., information regarding the person's purpose at the premise). In this case, the package deliverer will provide the homeowner with identification and matter information (e.g., "I am the package deliverer and I have a package for you"). Because the homeowner may not be sure that the package deliverer is being truthful, the homeowner may still want the package deliverer to believe that the homeowner is inside the house. Therefore, the homeowner may make up an excuse for why he/she cannot come to the door (e.g., "I'm taking a nap," "I'm feel really sick," "I'm really busy," etc.) and give the package deliverer instructions with respect to the handling of the package.

In certain embodiments, a notification message is generated and sent to the subscriber's (e.g., homeowner) mobile device 103a. The notification message may include a request to establish a communication session (e.g., voice session, video session, etc.) over the wireless network 109 (e.g., a cellular network) between the mobile device 103a (e.g., mobile phone) and the device 117 at the premise. The request may, for instance, be generated at the premise device 117, via the dwelling presence notification platform 101, to facilitate communication between the user and the detected person. In one scenario, the communication session may be established between a user's mobile phone and an intercom near the doorbell rung by the detected person. In this way, the communication session may be provided to the user through the user's mobile phone and to the detected person through the intercom. In certain other embodiments, the communication session request may further contain a request for the user's approval to establish the communication session.

It is noted that the mobile devices 103 may be any type of mobile terminal including a mobile handset, mobile station, mobile unit, multimedia computer, multimedia tablet, communicator, netbook, Personal Digital Assistants (PDAs), smartphone, etc. It is also contemplated that the mobile devices 103 may support any type of interface for supporting the presentment or exchange of data. In addition, mobile devices 103 may facilitate various input means for receiving and generating information, including touch screen capability, keyboard and keypad data entry, voice-based input mechanisms, accelerometer (e.g., shaking the mobile device 103), and the like. Any known and future implementations of mobile devices 103 are applicable. It is noted that, in certain embodiments, the mobile devices 103 may be configured to establish peer-to-peer communication sessions with each other using a variety of technologies—i.e., near field communication (NFC), Bluetooth, infrared, etc. Also, connectivity may be provided via a wireless local area network (LAN). By way of example, a group of mobile devices 103 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each mobile device 103, i.e., IP addresses that are accessible to devices connected to the service provider network 111 as facilitated via a router.

In various embodiments, a service provider may initiate the establishment of the communication session over the cellular network 109 based on the registration status of the mobile device 103a associated with the user. In various other embodiments, the establishment of the communication session may require the user's permission for the communication session. In this way, the user may control whether or not the communication session is established. As an example, a notification may be sent to a user's mobile phone 103a via short message service (SMS), email, and/or voice session to alert the user of a person's presence outside the user's home. The notification may also include an approval request to initiate the communication session between the user and the detected person. If, for instance, the user knows that there is an adult inside the user's home, the user may deny the request since someone is available to answer the door. On the other hand, if the user knows that no one is home, the user may want to approve the request to establish the communication session so that the user may communicate with the detected person to create the appearance that the user is inside the premise or dwelling.

In some embodiments, the presence indication signal provides an aural indicator via the device 117 within the premise of the user. For example, the aural indicator may include a doorbell chime. In one scenario, a person's presence may be detected on residential property when that person rings a doorbell next to the entrance of a house. Consequently, a doorbell chime may be emitted from inside the house. If, for instance, a burglar rang the doorbell, the doorbell chime from inside the home would most likely not raise any suspicions that the doorbell is anything other than a common doorbell. That is, the burglar will be made to believe that the doorbell is merely part of an ordinary doorbell system.

In further embodiments, the notification message may trigger a presentation of an equivalent or identical indicator with respect to the aural indicator. By way of example, if the aural indicator provided via the premise device 117 is a doorbell chime, the notification message may trigger the mobile device 103a to initiate a ringtone emulating the doorbell chime.

In some embodiments, the dwelling presence notification platform 101, the mobile devices 103, and other elements of the system 100 may be configured to communicate via the service provider network 111. According to certain embodiments, one or more networks, such as the data network 105, the telephony network 107, and/or the wireless network 109, may interact with the service provider network 111. The networks 105-109 may be any suitable wireline and/or wireless network, and be managed by one or more service providers. For example, the data network 105 may be any local area network (LAN), metropolitan area network (MAN), wide area network (WAN), the Internet, or any other suitable packet-switched network, such as a commercially owned, proprietary packet-switched network, such as a proprietary cable or fiber-optic network. The telephony network 107 may include a circuit-switched network, such as the public switched telephone network (PSTN), an integrated services digital network (ISDN), a private branch exchange (PBX), or other like network. Meanwhile, the wireless network 109 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, the networks 105-109 may be completely or partially contained within one another, or may embody one or more of the aforementioned infrastructures. For instance, the service provider network 111 may embody circuit-switched and/or packet-switched networks that include facilities to provide for transport of circuit-switched and/or packet-based communications. It is further contemplated that the networks 105-109 may include components and facilities to provide for signaling and/or bearer communications between the various components or facilities of the system 100. In this manner, the networks 105-109 may embody or include portions of a signaling system 7 (SS7) network, Internet protocol multimedia subsystem (IMS), or other suitable infrastructure to support control and signaling functions.

Figure 2A:
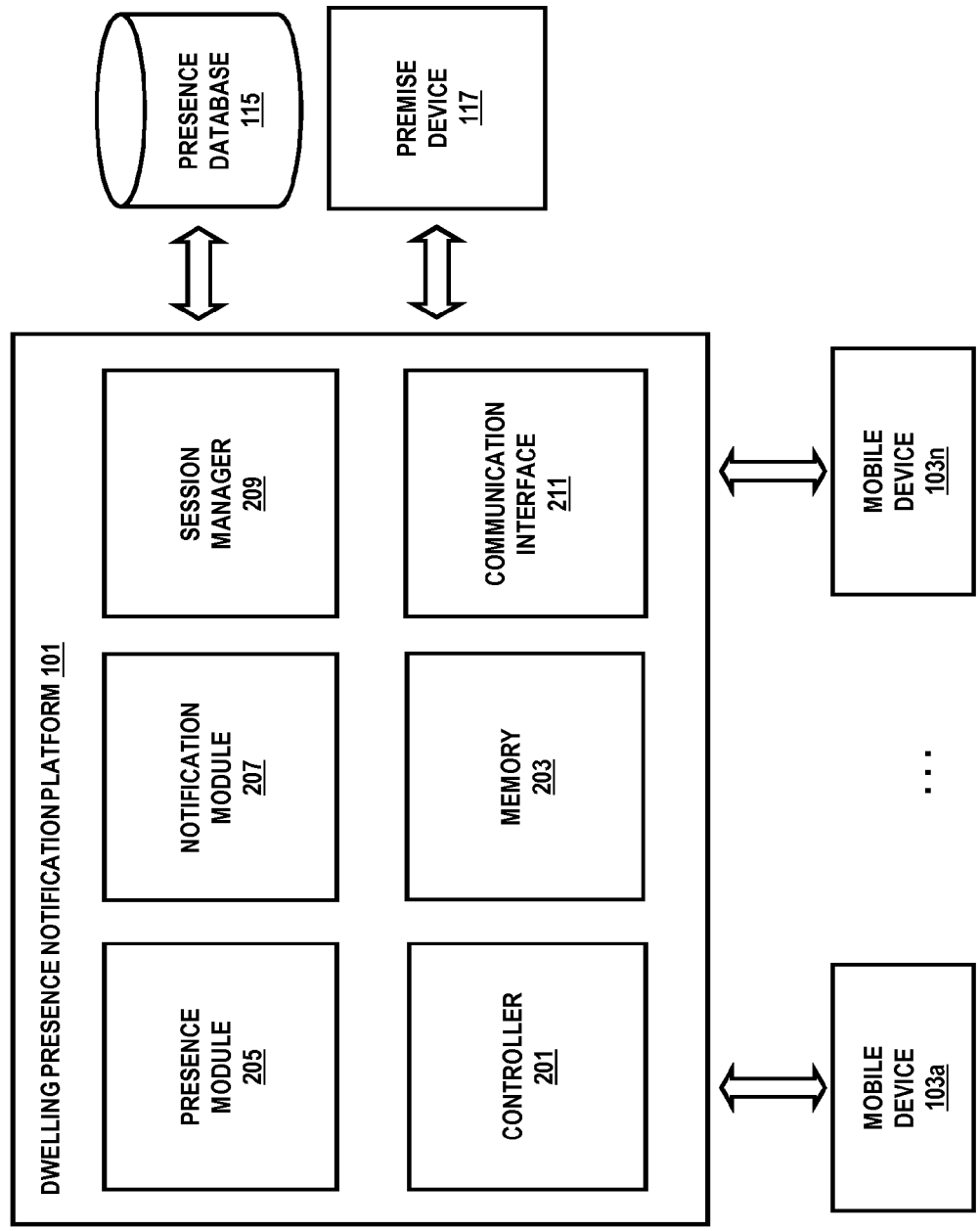
FIGS. 2A and 2B are, respectively, a diagram of the components of a dwelling presence notification platform and a premise device, according to various embodiments.

FIG. 2A is a diagram of the components of a dwelling presence notification platform, according to an exemplary embodiment. The dwelling presence notification platform 101 may comprise computing hardware (such as described with respect to FIG. 8), as well as include one or more components configured to execute the processes described herein for providing presence-based mobile communication interface services of the system 100. It is contemplated that the functions of these components may be combined in one or more components or performed by other components of equivalent functionality. In one implementation, the dwelling presence notification platform 101 includes a controller (or processor) 201, memory 203, a presence module 205, a notification module 207, a session manager 209, and a communication interface 211.

The controller 201 may execute at least one algorithm for executing functions of the dwelling presence notification platform 101. For example, the controller 201 may interact with the presence module 205 to detect the presence of a person at a premise belonging to a user and, in response to the detection, generate a presence indication signal to be presented at the device 117 within the premise. In addition, the presence module 205 may generate a notification message for transmission over a wireless network 109 to a mobile device 103a associated with the user, for instance, to alert the user of the person's presence. As mentioned, the wireless network 109 may be any number of wireless network types including a cellular network.

Next, the controller 201 may work with the notification module 207 to receive notification messages over the wireless network 109 for transmission to the mobile device 103a associated a user. The notification module 207 may then forward the notification message to the mobile device 103a based on the registration status of the mobile device 103a with a notification service. By way of example, the notification module 207 may forward the notification message to the mobile device 103a if it is determined that the mobile device 103a is registered with the notification service.

The controller 201 may operate in conjunction with the session manager 209 to establish a communication session over the wireless network 109 between the mobile device 103a and the device 117 within the premise based on the registration status (e.g., registered, unregistered, etc.). In addition, the establishment of the communication session may further be based on the user's explicit approval. As such, the session manager 209 may also generate a request for an approval from the user for the communication session establishment. If, for instance, it is determined that the user has approved the communication session, the session manager 209 may indicate the appropriate signaling to establish the communication session. Otherwise, the session manager 209 may deny the request.

The controller 201 may further utilize the communication interface 211 to communicate with other components of the dwelling presence notification platform 101, the mobile devices 103, the premise device 117, and other components of the system 100. The communication interface 211 may include multiple means of communication. For example, the communication interface 211 may be able to communicate over short message service (SMS), multimedia messaging service (MMS), internet protocol, instant messaging, voice sessions (e.g., via a phone network), email, or other types of communication. As provided, according to one embodiment, such methods may be used to transmit messages to acquire permission from the user to establish a communication session to enable communication between a user and a person at the premise of the user.

Figure 2B:
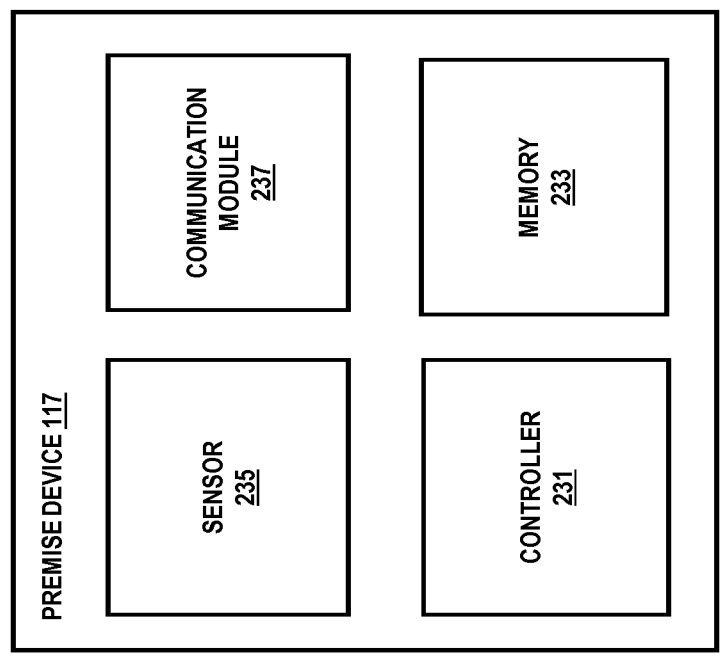

FIG. 2B is a diagram of the components of a premise device, according to an exemplary embodiment. The premise device 117 may include computing hardware (such as described with respect to FIG. 8), as well as include one or more components configured to execute the processes described herein for providing presence-based mobile communication interface services of the system 100. It is contemplated that the functions of these components may be combined in one or more components or performed by other components of equivalent functionality. In one embodiment, the premise device 117 includes a controller (or processor) 231, memory 233, a sensor 235, and a communication module 237.

The controller 231 may execute at least one algorithm for executing functions of the premise device 117. For example, the controller 231 may work with the sensor 235 to detect the presence of a person at a premise of a user (or subscriber). The sensor 235 may, for instance, include a doorbell, a camera, or a sensory device (e.g., motion sensor, heat sensor, etc.) to detect the person's presence at the premise. In one embodiment, the sensor 235 is a separate component and can work in conjunction with a doorbell, wherein the activation of a button from the door bell is detected by the sensor 235. Also, as a peripheral or supplemental device to the doorbell, the sensor 235 can provide motion detection to determine the presence of a person or thing, as well as audio or visual detection methods. As mentioned, the dwelling presence notification platform 101 may direct the premise device 117, via the sensor 235, to perform such detection functions.

The controller 231 may also utilize the communication module 237 to communicate with other components of the premise device 117, the dwelling presence notification platform 101, the mobile devices 103, and other components of the system 100. The communication interface 211 may include multiple means of communication, such as over SMS, MMS, internet protocol, instant messaging, voice sessions (e.g., via a phone network), email, or other types of communication. For example, the dwelling presence notification platform 101 may cause the premise device 117 to generate a notification message in response to a presence detection. The notification message can then be transmitted over a wireless network 109 to a mobile device 103a through the communication module 237. As such, the communication module 237 may include a transceiver to communicate using wireless technologies and/or wired technologies.

Figure 3:
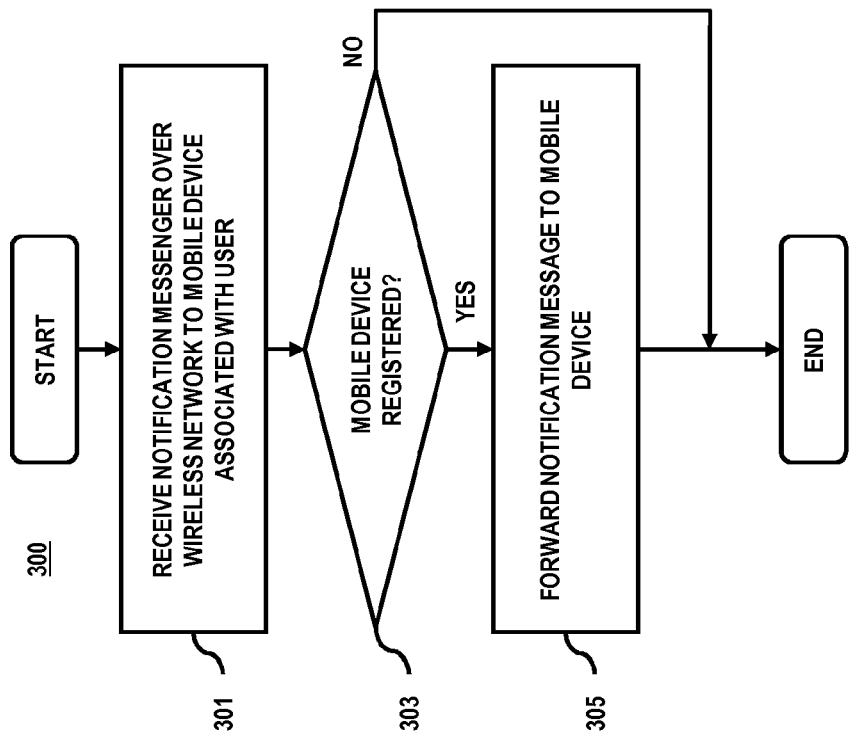
FIG. 3 is a flowchart of a process for providing presence-based communication over a cellular network for a dwelling, according to an exemplary embodiment.

FIG. 3 is a flowchart of a process for providing presence-based communication over a cellular network for a dwelling, according to an exemplary embodiment. For the purpose of illustration, process 300 is described with respect to FIG. 1. It is noted that the steps of the process 300 may be performed in any suitable order, as well as combined or separated in any suitable manner. In step 301, the dwelling presence notification platform 101 may receive a notification message over the wireless network 109 from premise device 117 to mobile device 103a associated with the user, wherein the notification message indicates generation of a presence indication signal by premise device 117. By way of example, the wireless network 109 that transports the notification message may be a cellular network. The device 117 may be an intercom device that is configured, for instance, to detect the presence of the person at the premise, generate the presence indication signal in response to the detection, and transmit the notification message over the cellular network 109.

In step 303, the dwelling presence notification platform 101 may determine a registration status of the mobile device 103a with a notification service provided by the dwelling presence notification platform 101. The dwelling presence notification platform 101 may then, as in step 305, forward the notification message to the mobile device 103a based on the registration status. For instance, if it is determined that the mobile device 103a is registered with the notification service, the dwelling presence notification platform 101 may forward the notification message to the mobile device 103a according to the method specified by the user account or profile. Subsequently, the notification message may be provided to the user as an alert indicating presence of the person at the premise of the user. On the other hand, the dwelling presence notification platform 101 may not forward the notification message if the mobile device 103a is not a registered device, but instead prompt the user accordingly, or offer to subscribe the user.

Figure 4:
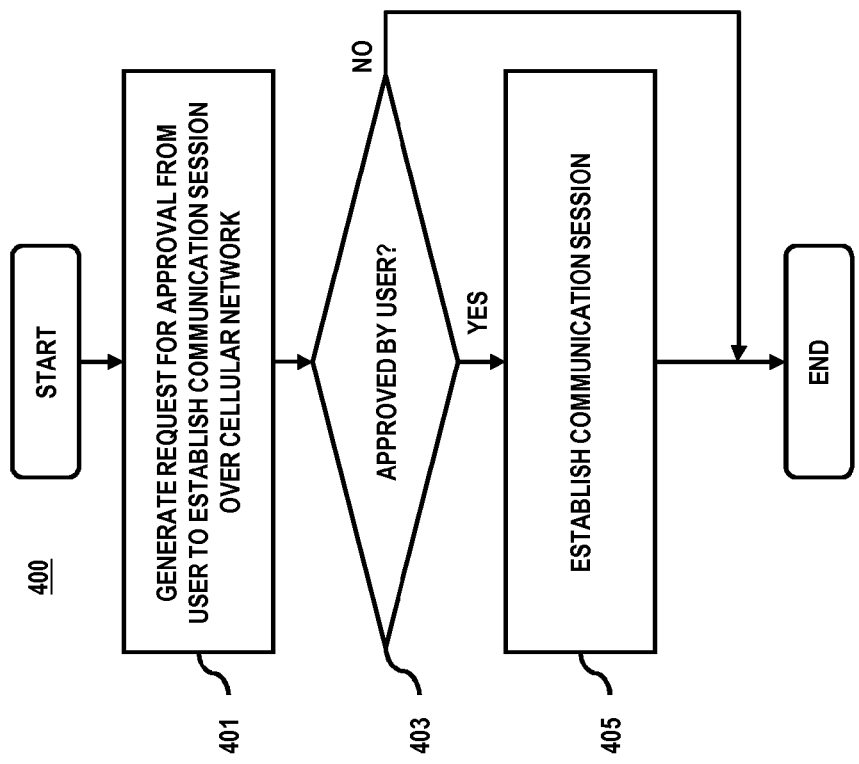
FIG. 4 is a flowchart of a process for establishing a communication session, according to an exemplary embodiment.

FIG. 4 is a flowchart of a process for establishing a communication session, according to an exemplary embodiment. For the purpose of illustration, process 400 is described with respect to FIG. 1. It is noted that the steps of the process 400 may be performed in any suitable order, as well as combined or separated in any suitable manner. In step 401, the dwelling presence notification platform 101 may generate a request for approval from the user to establish the communication session over the cellular network 109 between the mobile device 103a of the user and the premise device 117. As discussed, the request may be transmitted to the user in a number of ways, such as via short message service (SMS), multimedia messaging service (MMS), email, voice session, etc.

In step 403, the dwelling presence notification platform 101 may determine whether the user has approved the request for the establishment of the communication session. If, for instance, it is determined that the user has approved the request, then, as in step 405, the dwelling presence notification platform 101 may establish the communication session. On the other hand, the communication session may not be established if it is determined that such request has been denied. In one scenario, a user may receive an alert via the mobile device 103a as a result of receiving a forwarded notification message.

Figure 5:
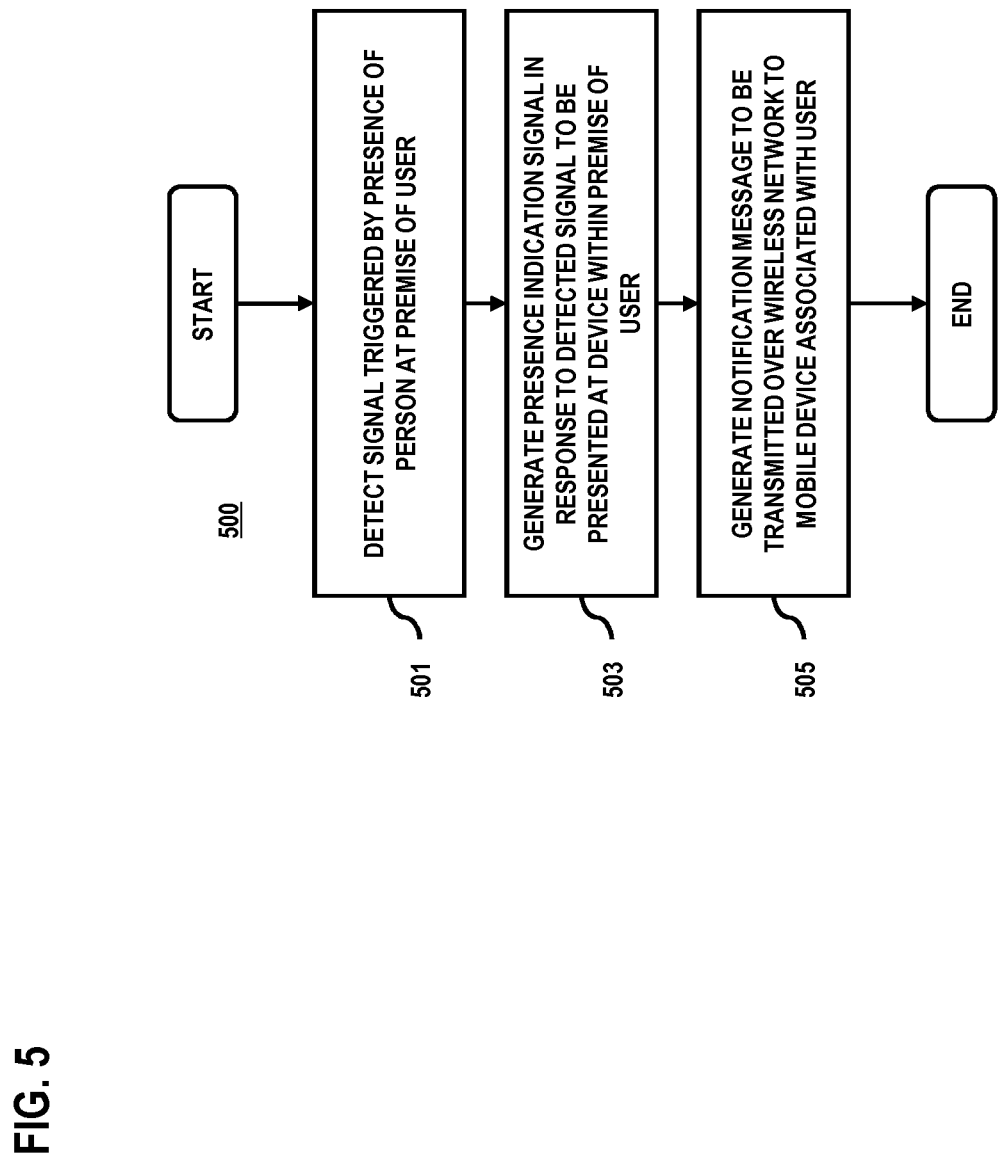
FIG. 5 is a flowchart of a process for notifying a user of presence of a person at a premise of a subscriber to the dwelling presence notification service, according to an exemplary embodiment.

FIG. 5 is a flowchart of a process for notifying a user of presence of a person at a premise of the user, according to an exemplary embodiment. For the purpose of illustration, process 500 is described with respect to FIG. 1. It is noted that the steps of the process 500 may be performed in any suitable order, as well as combined or separated in any suitable manner. In step 501, the premise device 117 may detect a signal triggered by presence of a person at a premise of a user. As described with respect to FIG. 2B, the detection may be triggered by the use of a doorbell, a sensor, or a camera located within the premise of a user, such as within the user's property, the area around a building, etc. In response to the detected signal, the premise device 117 may, as in step 503, then generate a presence indication signal to be presented at the premise device 117. As discussed, the premise device 117 may, for instance, include an intercom device as well as other communication devices within the premise.

In step 505, the premise device 117 may further generate a notification message to be transmitted over the wireless network 109 to the mobile device 103a associated with the user. The notification message indicates the generation of the presence indication signal.

Figure 6:
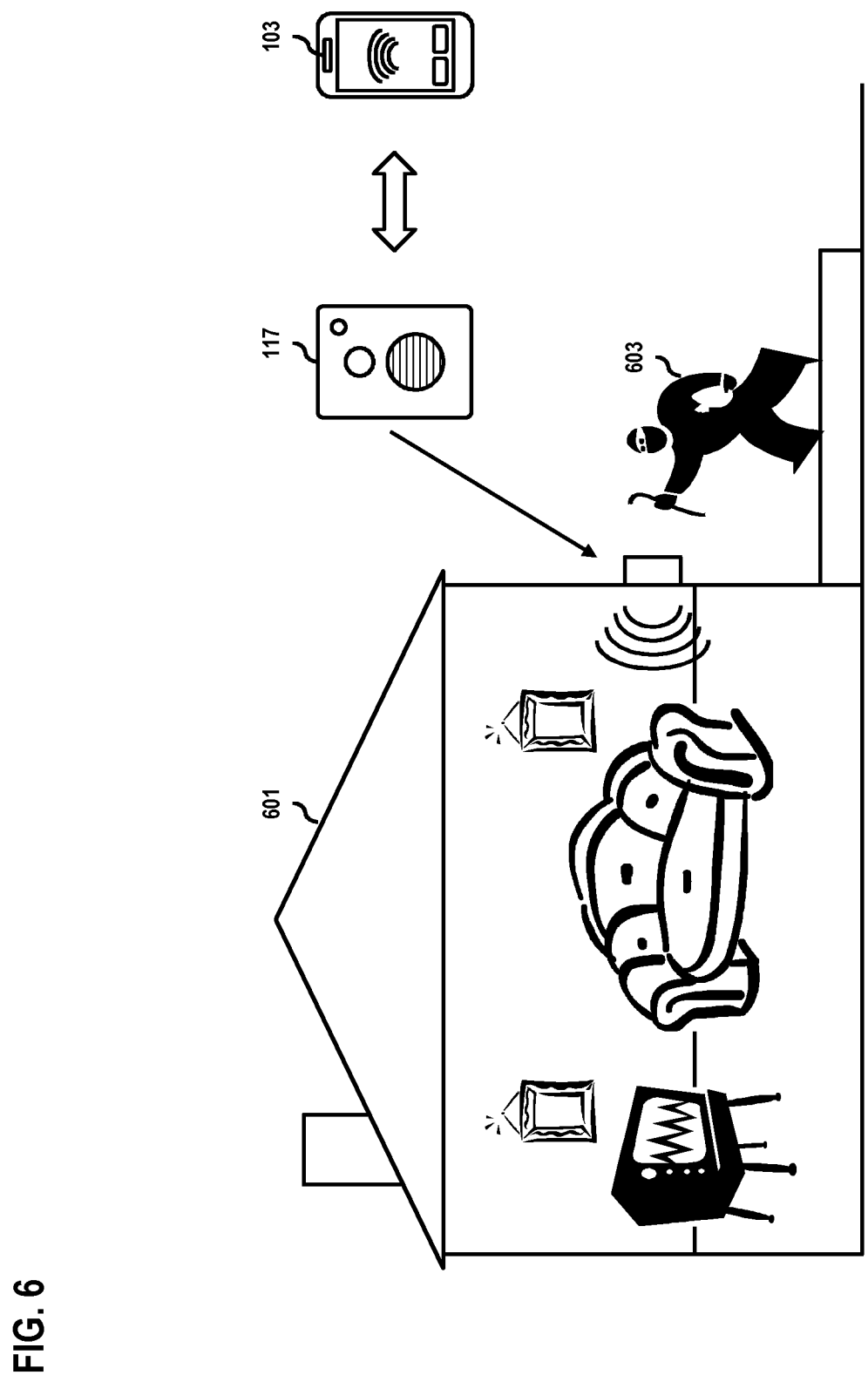
FIG. 6 is a diagram illustrating an applicability of presence-based communication over a cellular network for a dwelling, according to an exemplary embodiment.

FIG. 6 is a diagram illustrating an applicability of presence-based communication over a cellular network for a dwelling, according to an exemplary embodiment. For illustrative purposes, the diagram is described with reference to the system 100 of FIG. 1. Dwelling 601, under this scenario, is a house, whereby a person 603 is a burglar, the premise device 117 includes an intercom device with a doorbell, and the mobile device 103 is a mobile phone belonging to the homeowner (or another occupant of the house). The burglar may, for instance, ring the house doorbell to see if anyone is at home. In response, a doorbell chime is emitted from within the home to emulate a traditional doorbell system.

As shown in FIG. 6, no one is currently at home. Although the television is on and there are lights on in the house, such indications were not enough to fool the burglar into believing that someone is home due to the burglar's knowledge that some homeowners may leave the television and the lights on to deter intruders. In this case, however, the ringing of the doorbell also caused a notification to be sent to the homeowner's mobile phone to alert the homeowner that there is someone at the front door of the house.

Figure 7:
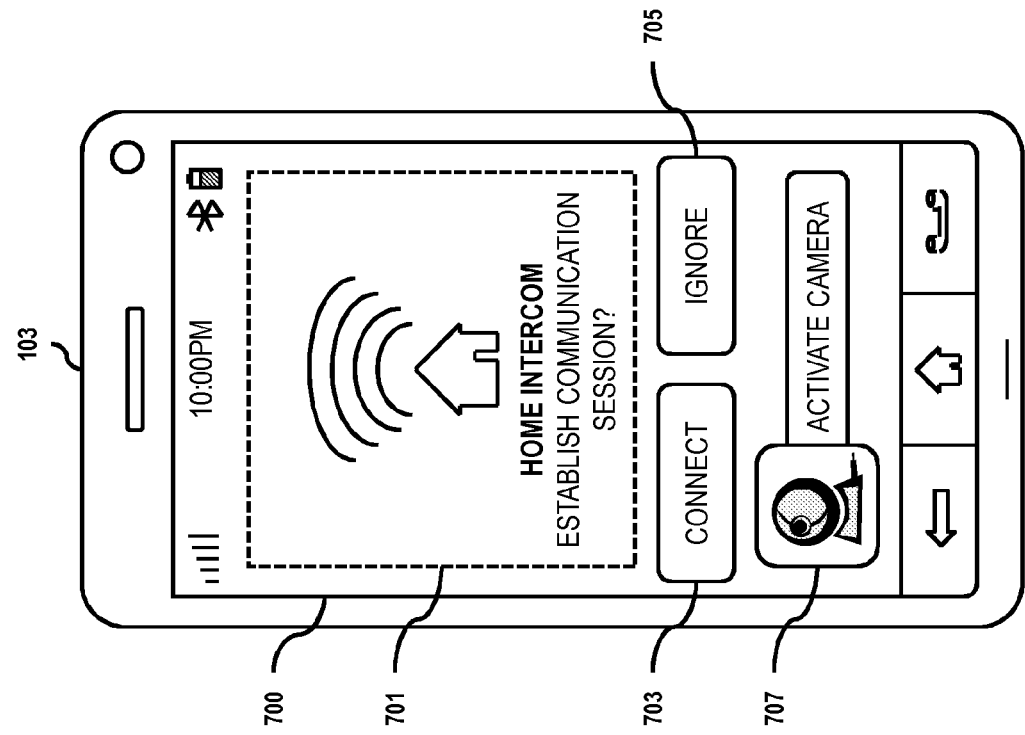
FIG. 7 is a diagram of a user interface for providing presence-based communication over a cellular network for a dwelling, according to an exemplary embodiment.

FIG. 7 is a diagram of a user interface for providing presence-based communication over a cellular network for a dwelling, according to an exemplary embodiment. For illustrative purposes, the diagram is described with reference to the system 100 of FIG. 1. For instance, FIG. 7 is a diagram of the mobile device 103 with the user interface 700 featuring a notification 701 and buttons 703, 705, and 707 (e.g., "Connect," "Ignore," and "Activate Camera"). As shown, a person's presence has been detected at the house.

Referring to FIG. 6, the detected person may have been detected outside the home near premise device 117 (e.g., the doorbell attached next to the front door). In response, as illustrated in FIG. 7, the notification 701 is sent to the mobile device 103 to alert the user of the person's presence. The notification 701 also includes an approval request from the user to establish a communication session via the home intercom system to enable the user to communicate with the detected person.

As demonstrated, the user may approve the request (e.g., connect with the home intercom system) by selecting button 703, ignore the request by selecting button 705, or activate a camera at the home by selecting button 707. By way of example, the user may activate the camera at the home to identify the detected person before deciding whether to approve or ignore the request for the establishment of a communication session. The camera may, for instance, be located near or part of the premise device 117. If it is determined that the user has approved the request, a communication session will then be established to enable communication between the user and the detected person. In this case, the user may establish either an voice or video session with the third party by choosing to activate a display on an intercom of the home intercom system (e.g., via additional options of button 707).

In the scenarios illustrated in FIGS. 6 and 7, the homeowner may pretend that he/she is inside the house by communicating with the detected person outside the house (e.g., the burglar). For example, if it is late in the evening, the homeowner may pretend to be tired by changing the sound and tone of his/her voice. The homeowner may ask the burglar, "Who is it? Can I help you?" At this point, the burglar may leave to avoid further confrontation. In the event that the burglar seeks to further verify that someone is actually home (e.g., by pretending to be someone else), the homeowner may indicate to the burglar that he/she is tired, that he/she is getting ready for bed, and that any solicitation should be for another day and time. Because the burglar has "confirmed" that someone is presently inside the house, the burglar may decide that it is not worth the risk to break into the house. As such, the burglar may leave without any further disruptions.

The arrangement and associated processes explained above, in certain embodiments, advantageously enhances security at a user premise by providing an effective communication mechanism whereby, for instance, the user can be perceived to be at the premise.

The processes described herein for providing presence-based communication over a cellular network for a dwelling may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
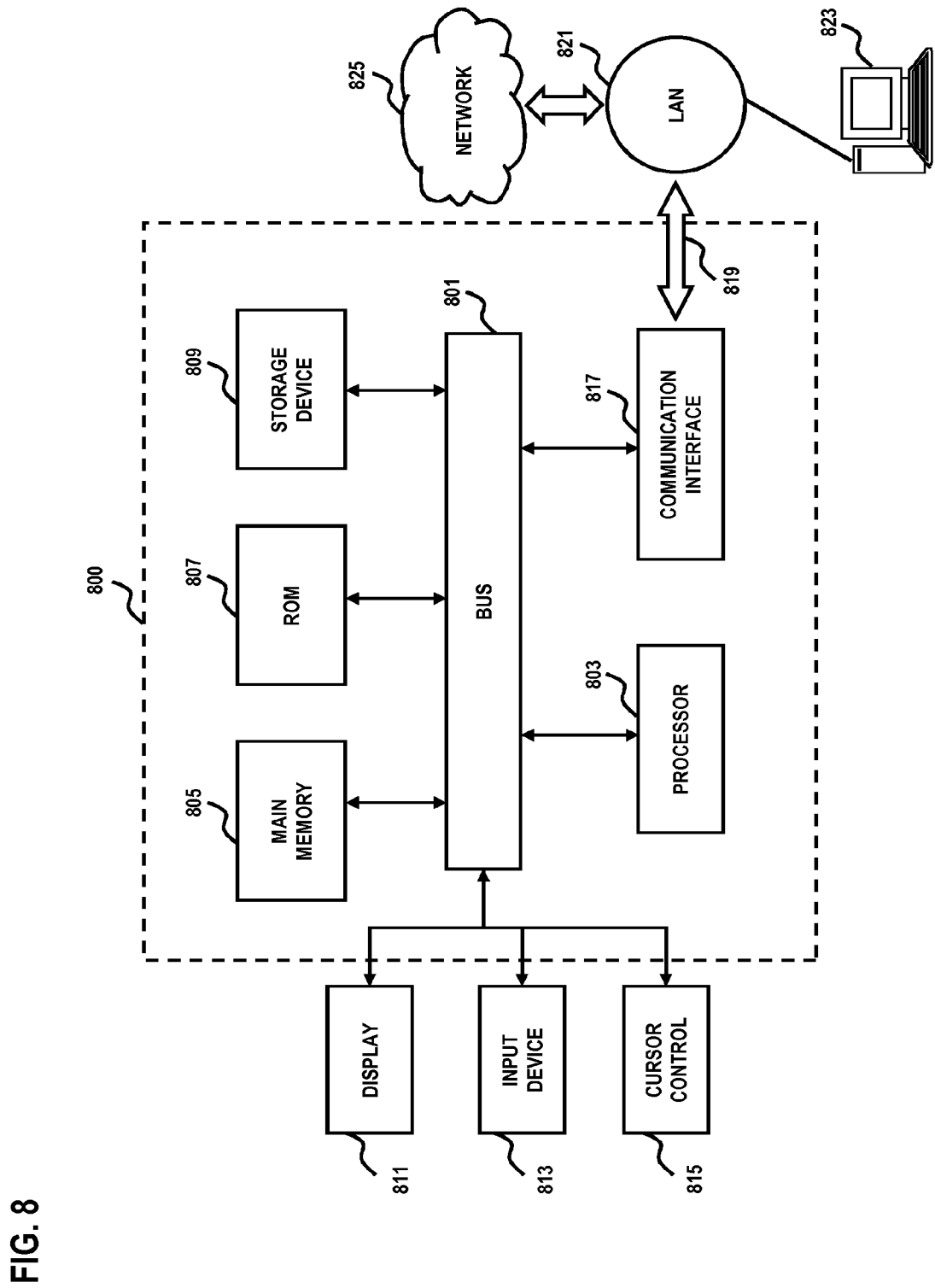
FIG. 8 is a diagram of a computer system that can be used to implement various exemplary embodiments.

FIG. 8 is a diagram of a computer system that can be used to implement various exemplary embodiments. The computer system 800 includes a bus 801 or other communication mechanism for communicating information and one or more processors (of which one is shown) 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk, flash storage, or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. Additional output mechanisms may include haptics, audio, video, etc. An input device 813, such as a keyboard including alphanumeric and other keys, is coupled to the bus 801 for communicating information and command selections to the processor 803. Another type of user input device is a cursor control 815, such as a mouse, a trackball, touch screen, or cursor direction keys, for communicating direction information and command selections to the processor 803 and for adjusting cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
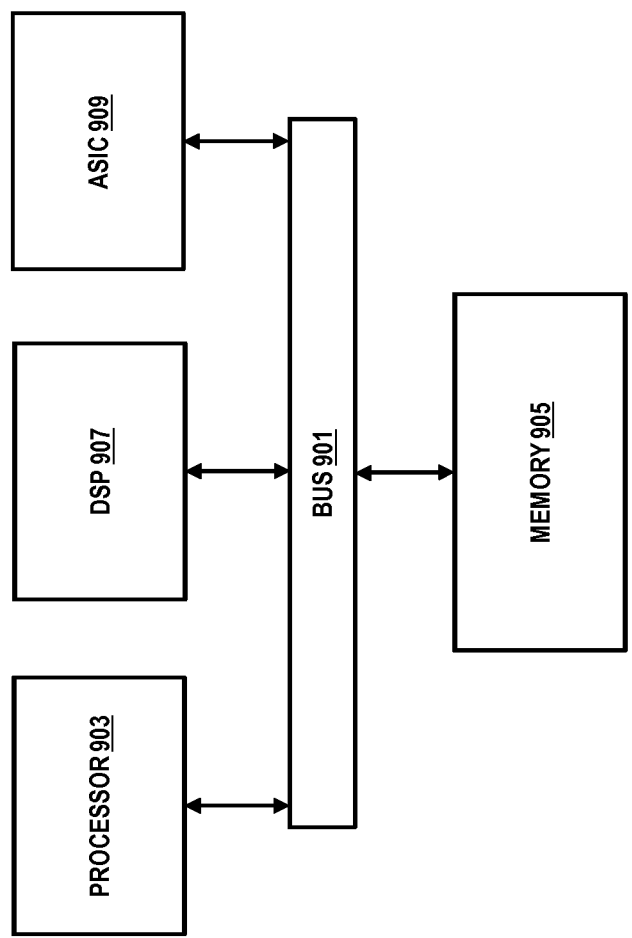
FIG. 9 is a diagram of a chip set that can be used to implement an embodiment of the invention.

FIG. 9 illustrates a chip set or chip 800 upon which an embodiment of the invention may be implemented. Chip set 900 is programmed to enable presence-based communication over a cellular network for a dwelling as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of enabling presence-based communication over a cellular network for a dwelling.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to enable presence-based communication over a cellular network for a dwelling. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving a notification message, over a wireless network, associated with a user, wherein the notification message indicates generation of a presence indication signal by a device within a premise of the user;
   determining a registration status of a mobile device associated with the user with a notification service;
   forwarding the notification message to the mobile device based on the registration status; and
   establishing a communication session between the mobile device and the device within the premise.

2. A method according to claim 1, wherein the wireless network is a cellular network, and the communication session is at least one of a voice session and a video session.

3. A method according to claim 2, wherein the communication session is established over the cellular network based on the registration status.

4. A method according to claim 3, further comprising:
   generating a request for an approval from the user to establish the communication session,
   wherein the establishment of the communication session is based on the approval from the user.

5. A method according to claim 1, wherein the device within the premise includes an intercom device, and the presence indication signal indicates an apparent presence of the user at the premise.

6. An apparatus comprising:
   at least one processor; and
   at least one memory including computer program code for one or more programs,
   the at least one memory and the computer program code configured to, with the at least one processor, cause the apparatus to perform at least the following,
     receive a notification message, over a wireless network, associated with a user, wherein the notification message indicates generation of a presence indication signal by a device within a premise of the user;
     determine a registration status of a mobile device associated with the user with a notification service;
     forward the notification message to the mobile device based on the registration status; and
     establish a communication session between the mobile device and the device within the premise.

7. An apparatus according to claim 6, wherein the wireless network is a cellular network, and the communication session is at least one of a voice session and a video session.

8. An apparatus according to claim 7, wherein the communication session is established over the cellular network based on the registration status.

9. An apparatus according to claim 8, wherein the apparatus is further caused to:
   generate a request for an approval from the user to initiate the establishment of the communication session,
   wherein the establishment of the communication session is based on the approval from the user.

10. An apparatus according to claim 6, wherein the device within the premise includes an intercom device, and the presence indication signal indicates an apparent presence of the user at the premise.

11. A method comprising:
    detecting a signal triggered by presence of a person at a premise of a user;
    generating a presence indication signal in response to the detected signal to be presented at a device within the premise of the user indicating an apparent presence of the user at the premise; and
    generating a notification message to be transmitted over a wireless network to a mobile device associated with the user, wherein the notification message indicates the generation of the presence indication signal.

12. A method according to claim 11, wherein the wireless network is a cellular network.

13. A method according to claim 12, further comprising:
    generating a request to establish a communication session over the cellular network between the mobile device and the device at the premise, wherein the notification message includes the request.

14. A method according to claim 11, wherein the presence indication signal provides an aural indicator via the device within the premise of the user.

15. A method according to claim 14, wherein the notification message triggers a presentation of an equivalent or identical indicator with respect to the aural indicator.

16. An apparatus comprising:
    at least one processor; and
    at least one memory including computer program code for one or more programs,
    the at least one memory and the computer program code configured to, with the at least one processor, cause the apparatus to perform at least the following,
      detect a signal triggered by presence of a person at a premise of a user;
      generate a presence indication signal in response to the detected signal to be presented at a device within the premise of the user indicating an apparent presence of the user at the premise; and
      generate a notification message to be transmitted over a wireless network to a mobile device associated with the user, wherein the notification message indicates the generation of the presence indication signal.

17. An apparatus according to claim 16, wherein the wireless network is a cellular network.

18. An apparatus according to claim 17, wherein the apparatus is further caused to:
    generate a request to establish a communication session over the cellular network between the mobile device and the device at the premise, wherein the notification message includes the request.

19. An apparatus according to claim 16, wherein the presence indication signal provides an aural indicator via the device within the premise of the user.

20. An apparatus according to claim 19, wherein the notification message triggers a presentation of an equivalent or identical indicator with respect to the aural indicator.

* * * * *